F. J. WEBER.
KETTLE.
APPLICATION FILED DEC. 20, 1911.
1,083,716.
Patented Jan. 6, 1914.
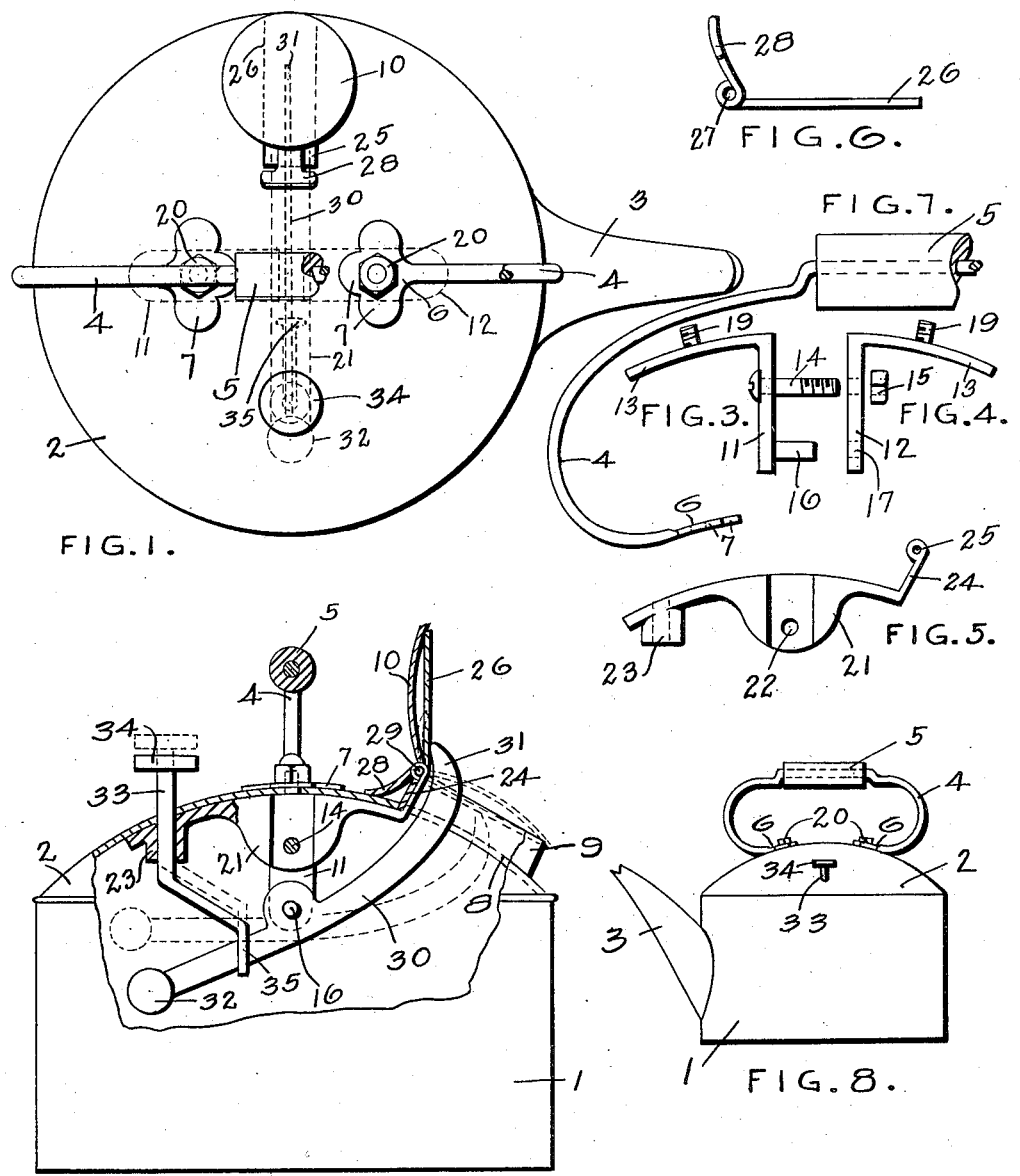
WITNESSES.
INVENTOR.
BY Fred J. Weber
LaPorte & Bean.
ATTYS.

UNITED STATES PATENT OFFICE.

FRED J. WEBER, OF PEORIA, ILLINOIS.

KETTLE.

1,083,716. Specification of Letters Patent. Patented Jan. 6, 1914.

Application filed December 20, 1911. Serial No. 667,039.

*To all whom it may concern:*

Be it known that I, FRED J. WEBER, a citizen of the United States, residing at Peoria, in the county of Peoria and State of Illinois, have invented certain new and useful Improvements in Kettles, of which the following is a specification.

The invention relates to improvements in kettles and has for one of its objects the provision on a kettle of a lid lifting attachment which will enable a lid to be readily raised when it is desired to fill or gain access to the interior of the kettle without liability of burning or scalding the hand.

A further object of the present invention is the provision of a kettle which may be filled while being held in the hand without any danger of burning or scalding the hand and without any danger of tipping the kettle and emptying the contents thereof.

A further object of my invention is the provision of a tea-kettle having a stationary handle, a lid located in the top or breast to one side of the handle, and a lever arrangement for operating the lid.

To the accomplishment of the foregoing and such other objects as may hereinafter appear, my invention consists in the construction, combination and arrangement of parts hereinafter described and then sought to be defined in the claims, reference being had to the accompanying drawings forming a part hereof and which illustrate merely a preferred embodiment of my invention, it being understood that various changes in the construction and details may be made in practice within the scope of the claims without digressing from my inventive idea which is defined therein.

In the drawings, Figure 1 represents a top plan view of a kettle fitted with my attachment, parts being shown broken away. Fig. 2 is a side elevation of the kettle, parts being shown broken away and in section. Figs. 3, 4, 5, 6 and 7 are perspective views of details. Fig. 8 is a side elevation of the left hand side of the kettle on a smaller scale.

In the embodiment of my invention illustrated in the drawings, the numeral 1 designates the body of the kettle, having the top or breast 2, and the spout 3. On top of the breast 2 is secured the bail 4 having the wooden handle portion 5. This bail 4 is secured in a stationary position on the top or breast 2 by means of suitable fastening means passing through the extremities 6 which are in the form of three claws or extended bearing portions 7. By having this arrangement the bail is held absolutely stationary and immovable relative to the kettle and this does away with any possibility of the kettle being tilted and the contents emptied due to a swinging of the kettle on the handle.

To one side of the bail 4 the top or breast is provided with the opening 8 having the extended rim portion 9 on which is adapted to seat or rest the hinged lid 10.

The manner of mounting the lid and its operating means will now be described.

Two bracket members 11 and 12 having the curved bearing portions 13 are adapted to be secured together by means of bolt 14 and nut 15. The bracket member 11 is provided with a stud 16 adapted to pass through an aperture 17 in the bracket member 12 for a purpose to be hereinafter described. In the curved bearing portions 13 of the bracket members 11 and 12 are formed the studs or projections 19 which are externally screw threaded and are adapted to extend through the extremity 6 of the bail 4. Nuts 20 are adapted to be screwed on said studs for the purpose of holding the bail immovable on the top or breast 2. It is obvious that separate bolts is an equivalent of this construction.

Mounted between the bracket members 11 and 12 is the member 21 which I shall term an assembling member, the upper surface of which is shaped to conform to the curvature of the interior of the top or breast 2. The member 21 is provided with an aperture 22 through which is adapted to pass the bolt 14, which thus constitutes a fastening means for holding the member in position, it being understood that this member extends approximately at right angles to the bail. At one end this member 21 is provided with the guiding sleeve or extension 23 while at the other end it is provided with the straight arm extension 24 which is adapted to be positioned along the inside of the rim extension 9, hereinbefore described. This arm extension 24 terminates in the eye 25. On the inside of the lid 10 is secured the flat bearing member 26 having an eye 27 formed at one end and at the same end being provided with an extending lug 28. The eyes 25 and 27 together with a pintle 29 form the hinge for the lid 10, the lug 28 forming a stop to prevent the cover from being opened beyond a predetermined point, as shown in Fig. 2. On the stud 16 is pivotally mounted the lid opening lever 30 having a curved operating portion or extremity 31 which is adapted to engage the inner surface of the flat bearing member 26 to force the lid 10 open. On the other end of the lever 30 is provided the counter weight 32 for holding the lid 10 in its open position. To operate the lever 30 the stem 33 is provided having the button 34 at one end and having its other end bifurcated or forked as at 35 to embrace lever 30. The stem 33 is mounted to slide in the guiding sleeve 23.

The operation of the device is evident from a consideration of the drawings and the specification.

When it is desired to replenish the contents of the receptacle the kettle is carried to the supply and the button 34 is forced downward by the thumb or one of the fingers of the operator, which action opens the lid to its full extent, the lid being held in that position due to the counter weight 32. The receptacle may be filled and the lid returned to its normal position.

The following advantages for this device are to be noted: The lid 10 is mounted to swing toward the handle so that when in open position it acts as a shield to protect the hand of the operator from the scalding and burning action of the steam in the receptacle. The parts of the lid and its hinge being permanently secured together there is no chance for the lid falling off. In view of the fact that the lid is loosely mounted and readily moves on its hinge, it serves as a safety valve so that when the pressure of the steam becomes too great the lid will be forced open to allow the escape of sufficient steam to prevent the water from boiling out of the spout. The locating of the opening and lid on the side renders it easy to fill the kettle while it is held in the hand. The utilization of the stationary bail prevents the tipping of the kettle while emptying or replenishing the contents and also prevents the wooden handle from getting hot due to direct contact with the cover of the receptacle.

My device is simple and will not get out of order easily. If it does, it may be readily repaired and put in condition for use again. It is of undoubted utility to the housewife and to any one who has occasion to use a receptacle of this character.

I claim—

1. In a device of the character described, in combination, a receptacle having a top or breast, said top or breast having a stationary handle and an opening located at one side of said handle, a lid for said opening hinged at a point adjacent the handle so as to swing toward said handle when opened, a weighted lever pivoted to said top or breast and adapted to actuate said lid, and means to operate said lever.

2. In a device of the character described, in combination, a receptacle having a top or breast, said top or breast having a stationary handle and an opening located at one side of said handle, a lid for said opening hinged at a point adjacent the handle so as to swing toward said handle when opened, a weighted lever pivoted to said top or breast and adapted to actuate said lid, and means to operate said lever, said means comprising a stem having a bifurcated extremity to embrace said lever.

3. In a device of the character described, in combination, a receptacle having a top or breast, said top or breast having an opening therein, spaced bracket members, an assembling member supported thereby, said assembling member having an eye at one end, a lid for said opening having an eye, a pintle for connecting said eyes to form a hinge, a lever pivoted between said brackets and bearing against said lid to operate the same, and means for actuating said lever.

4. In a device of the character described, in combination, a receptacle having a top or breast, said top or breast having an opening therein, spaced bracket members secured to the inside of said top or breast, an assembling member secured between said bracket members and having an eye at one end located adjacent said opening, said assembling member also having a sleeve at the other end, a lid for said opening having an eye, a pintle for connecting said eyes to form a hinge, a lever pivoted between said spaced brackets and adapted to engage said lid to operate the same, and a stem slidably positioned in said sleeve and engaging said lever, whereby the same may be actuated.

5. In a device of the character described, in combination, a receptacle having a top or breast, a stationary handle located centrally thereon, said top or breast having an opening therein located at one side of said handle, spaced bracket members adapted to be secured to the inside of said top or breast, securing means for holding said brackets and said handle to said top or breast, one of said brackets having a bolt and a stud below said bolt and the other of said bracket members having openings in alinement with the bolt and said stud, an assembling member having its upper surface shaped in conformity to the inner surface of the top or breast, said assembling member being secured in position by said bolt and having an eye at one end located adjacent said opening, and having a sleeve near its other end, a lid for said opening having an eye, a pintle for connecting said eyes to form a hinge, a lever pivotally mounted on said stud and having a curved operating portion which is adapted to engage said lid, the other portion of said lever being weighted, a stem slidably positioned in said sleeve and adapted to engage the weighted portion of said lever to operate the same.

In testimony whereof I affix my signature, in presence of two witnesses.

FRED J. WEBER.

Witnesses:
GEORGE T. BEAN,
LILLIAN E. TIEMEYER.

---

Copies of this patent may be obtained for five cents each, by addressing the "Commissioner of Patents, Washington, D. C."